Feb. 8, 1944.    W. E. EDWARDS ET AL    2,340,870
APPARATUS FOR AUTOMATICALLY SEVERING TUBING
Filed Sept. 29, 1942    10 Sheets-Sheet 1
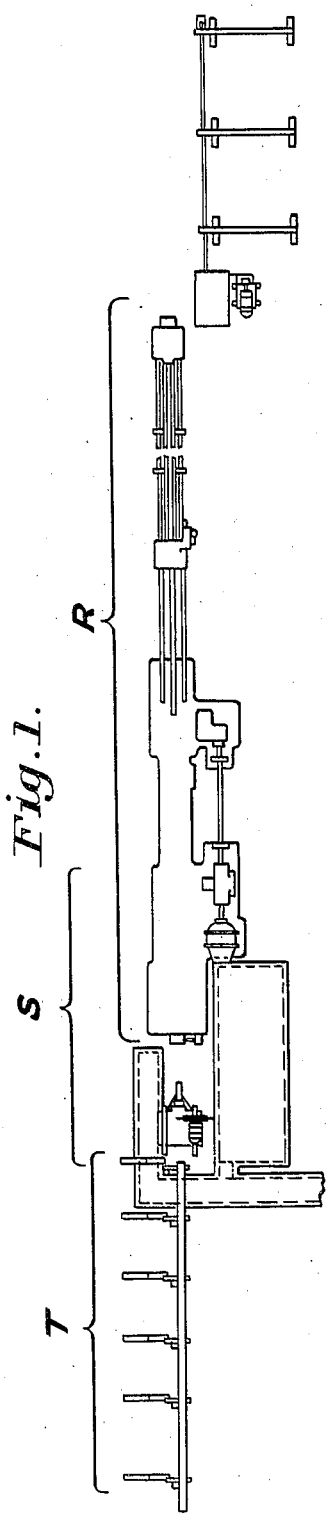
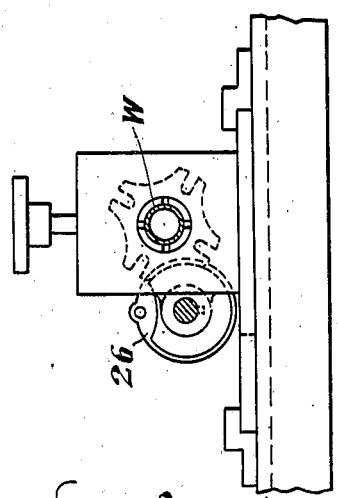
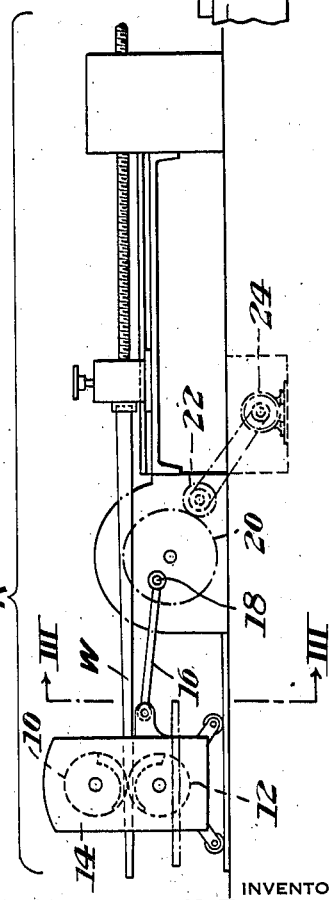
INVENTORS
WILLIAM E. EDWARDS,
WILLARD J. FLETCHER
and LYSLE E. ROBINSON,
by: John E. Jackson
their Attorney.

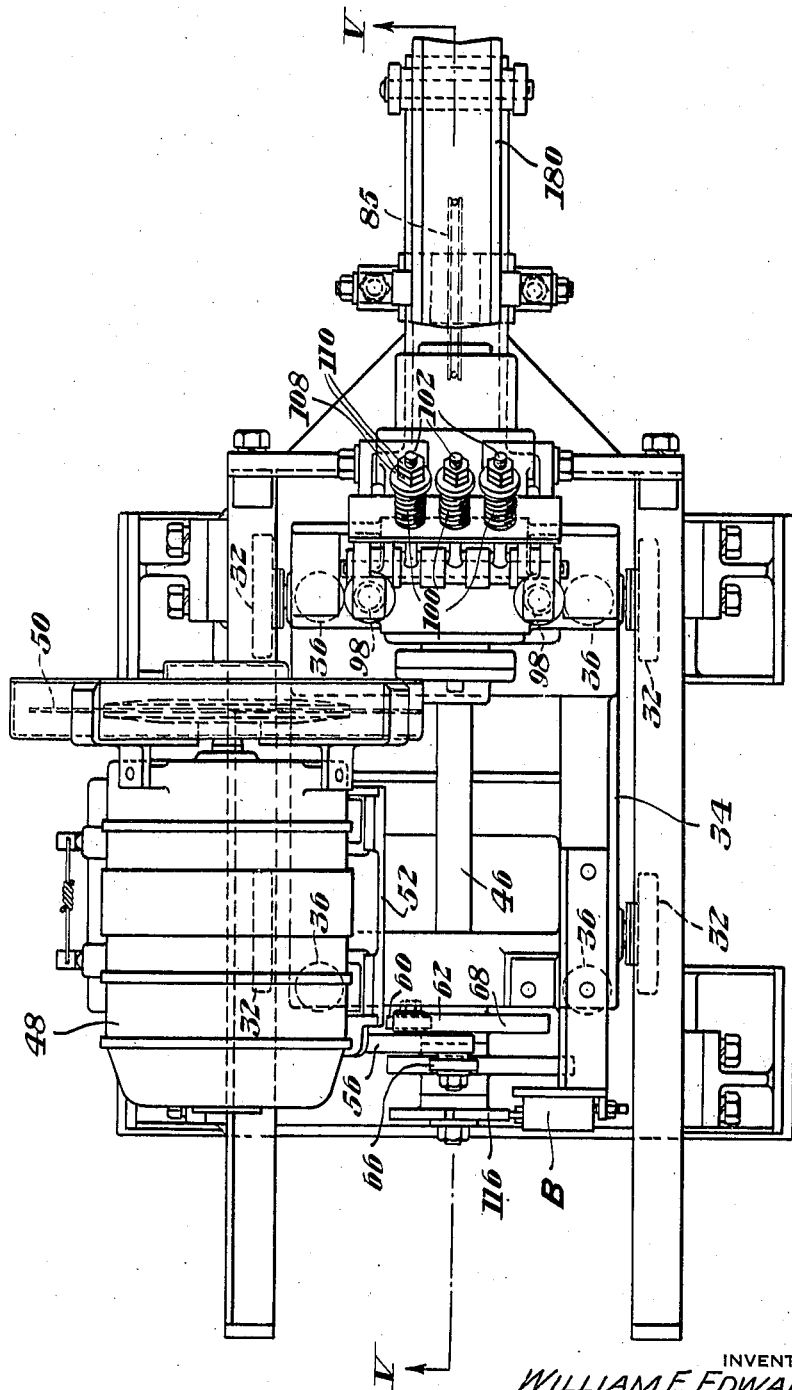

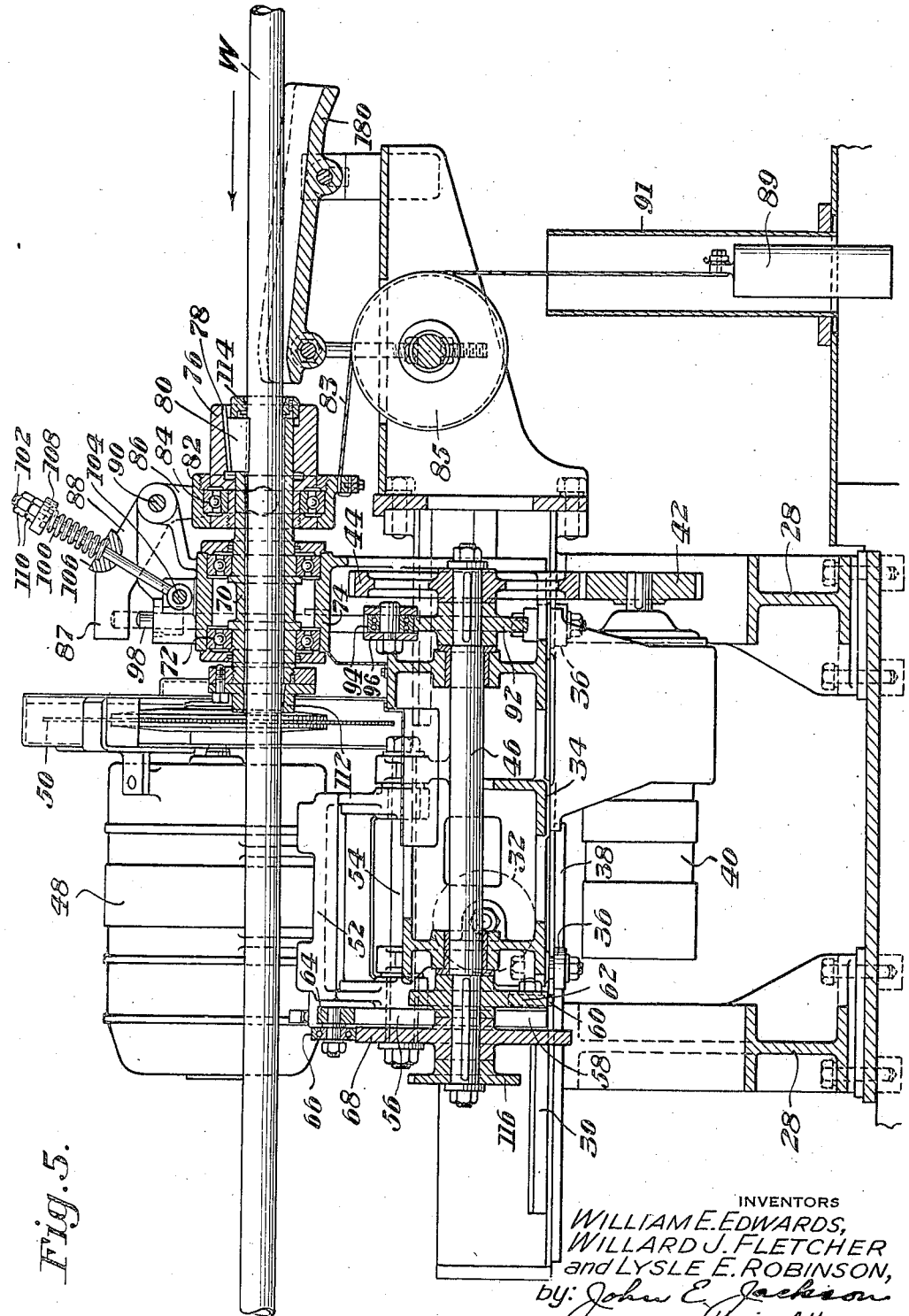

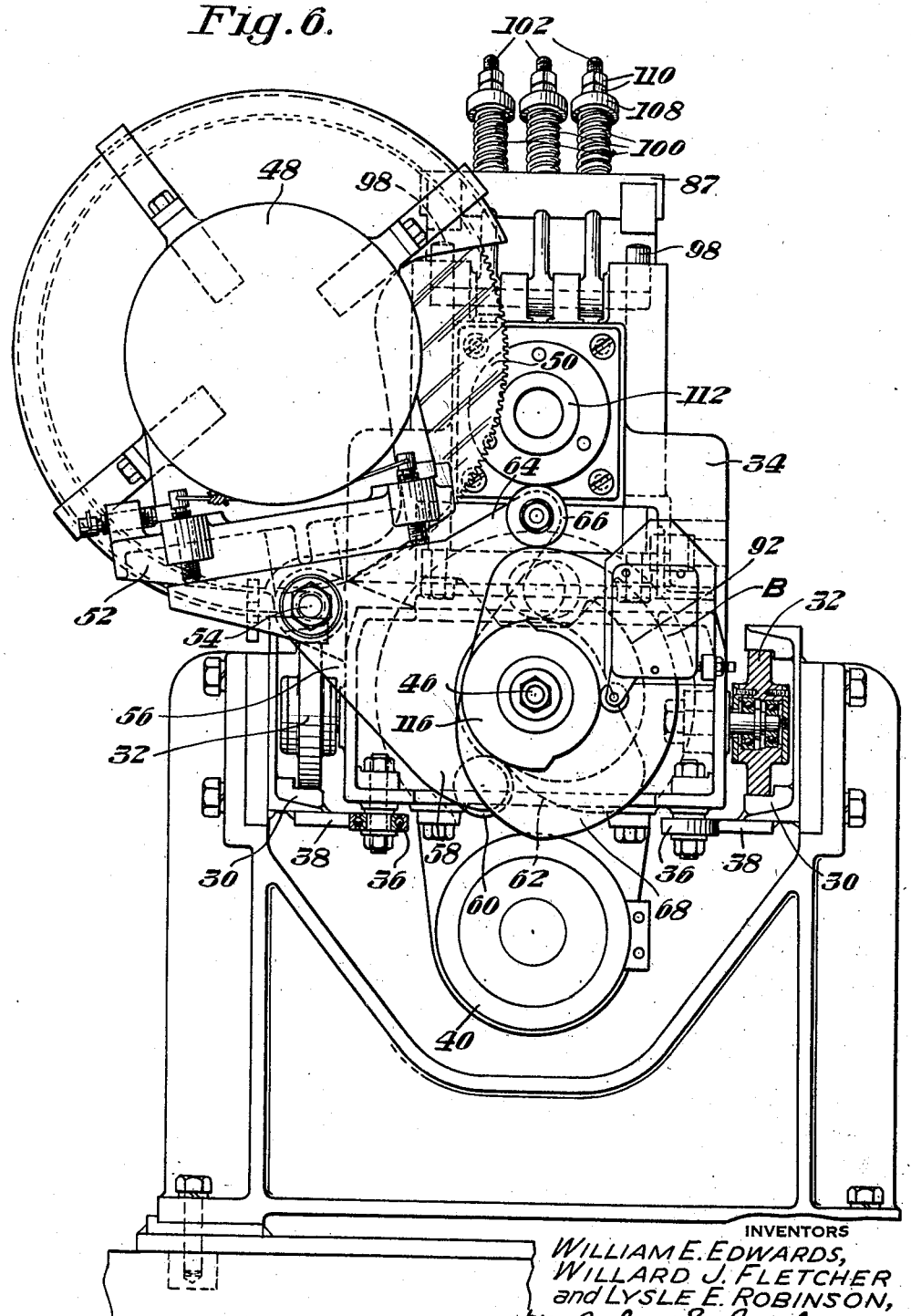

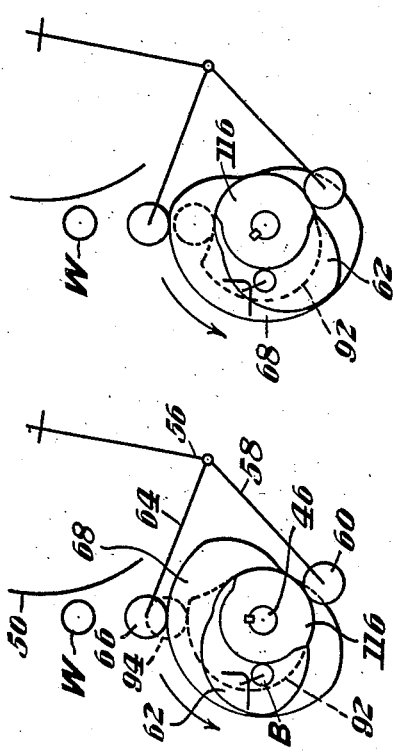

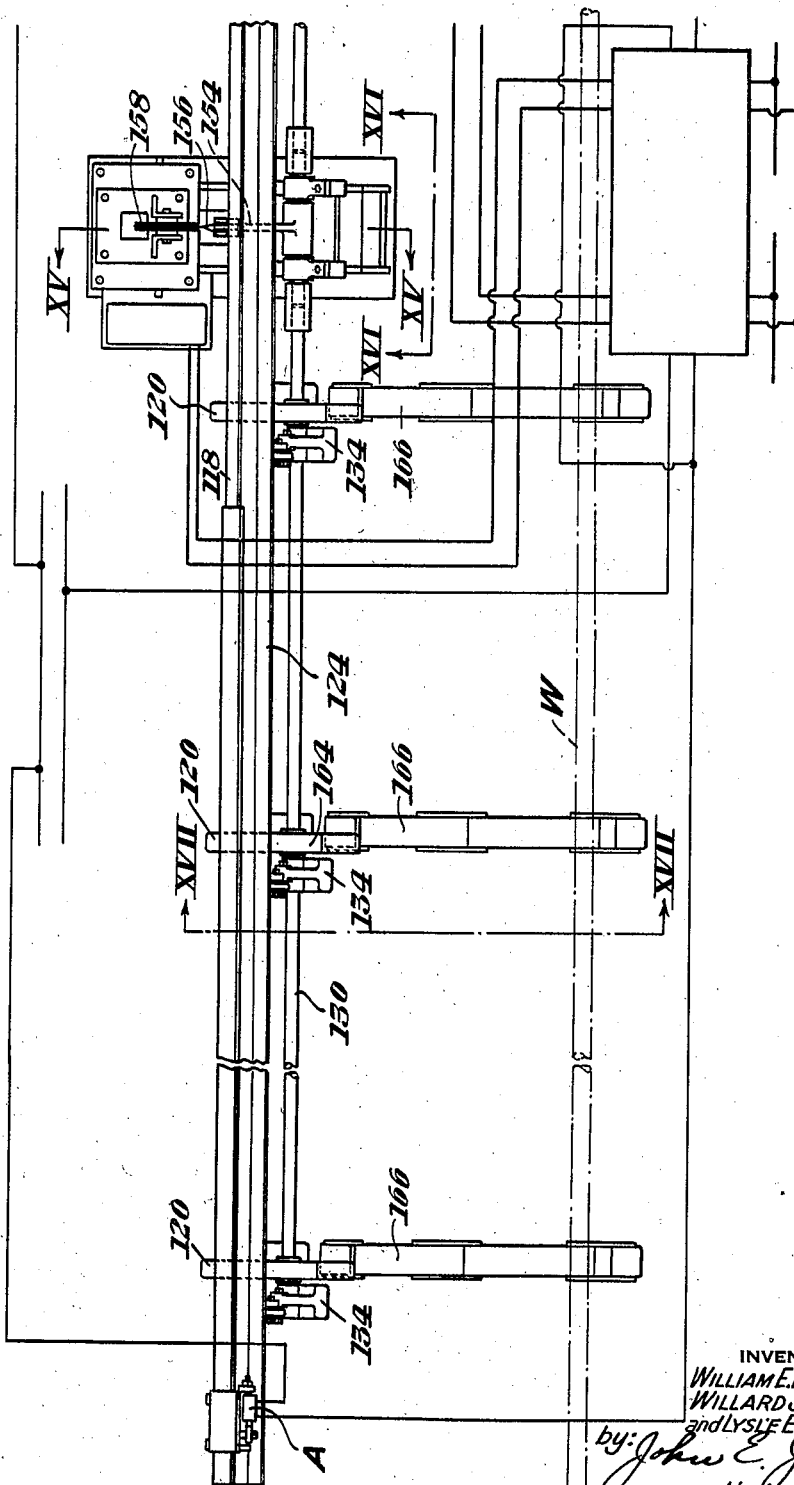

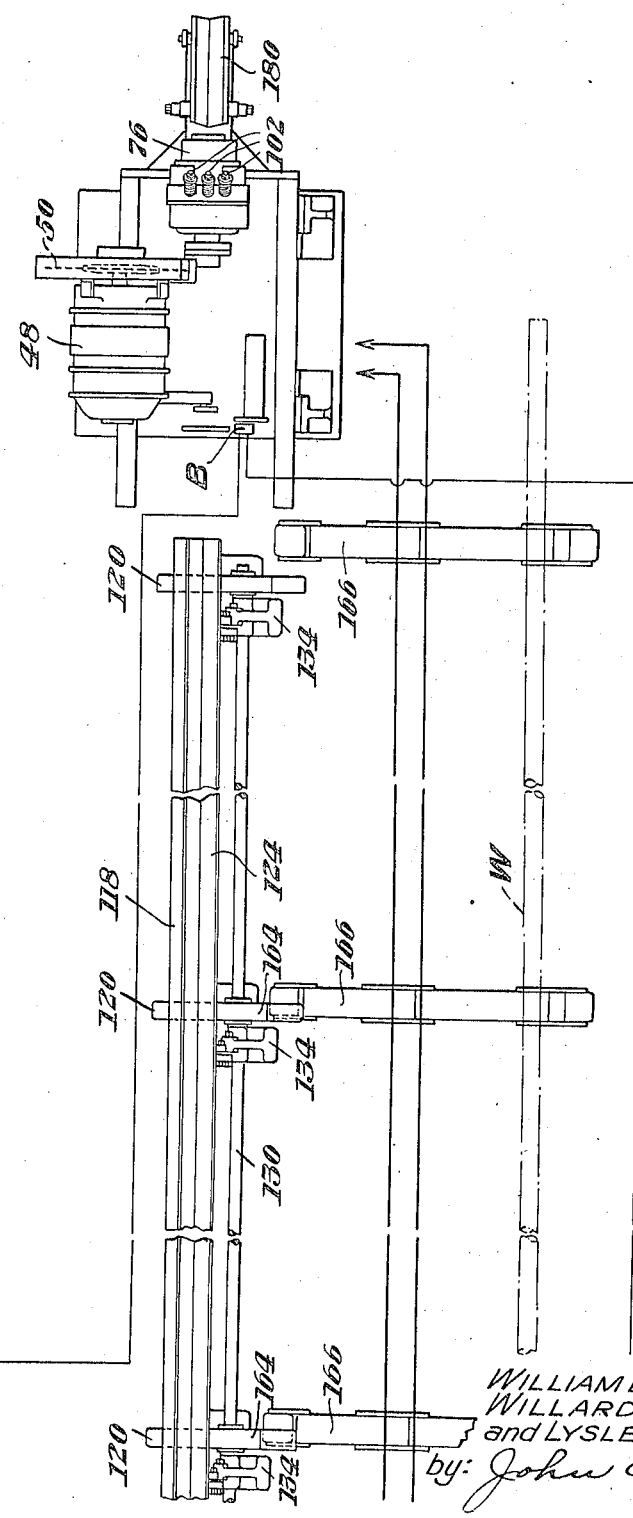

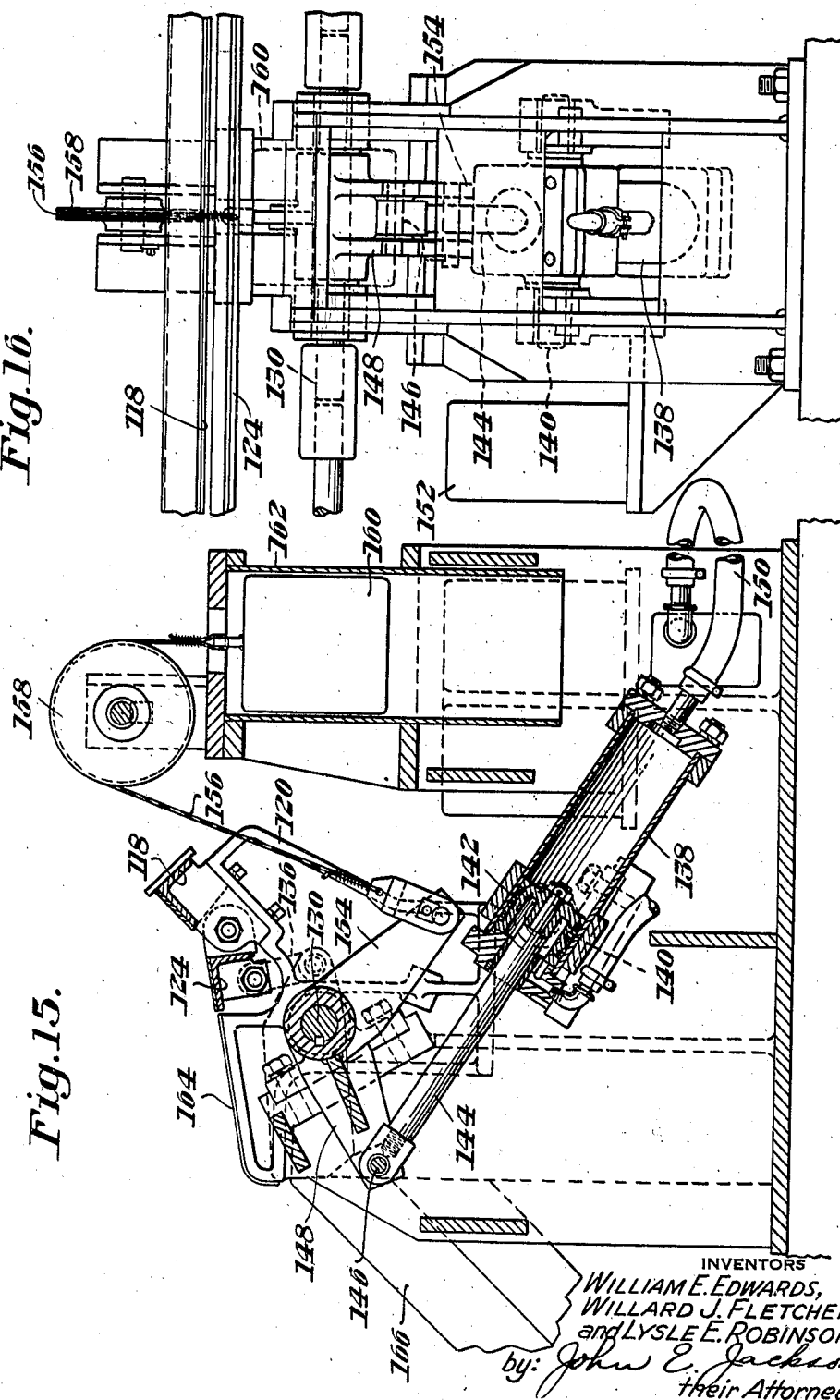

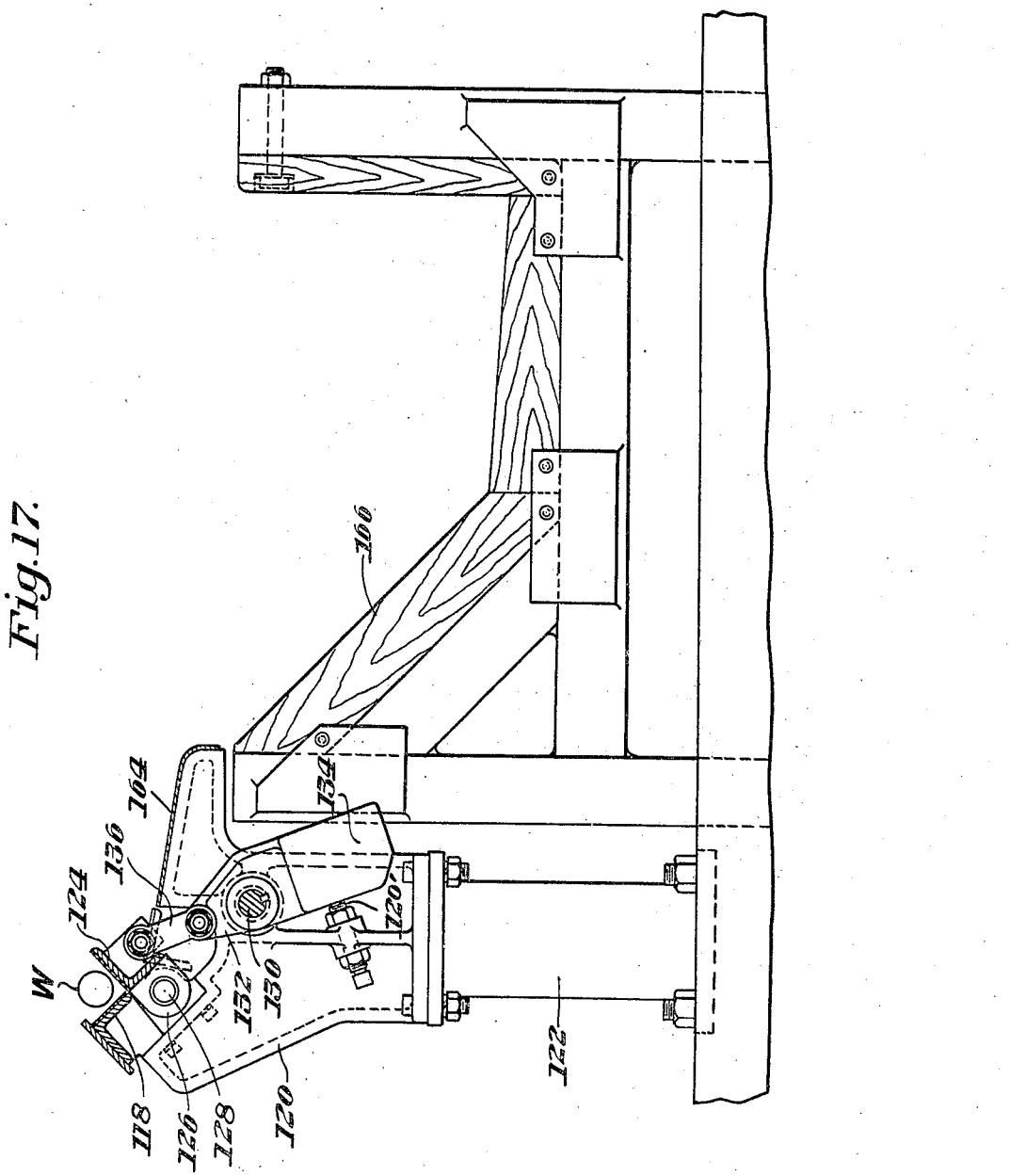

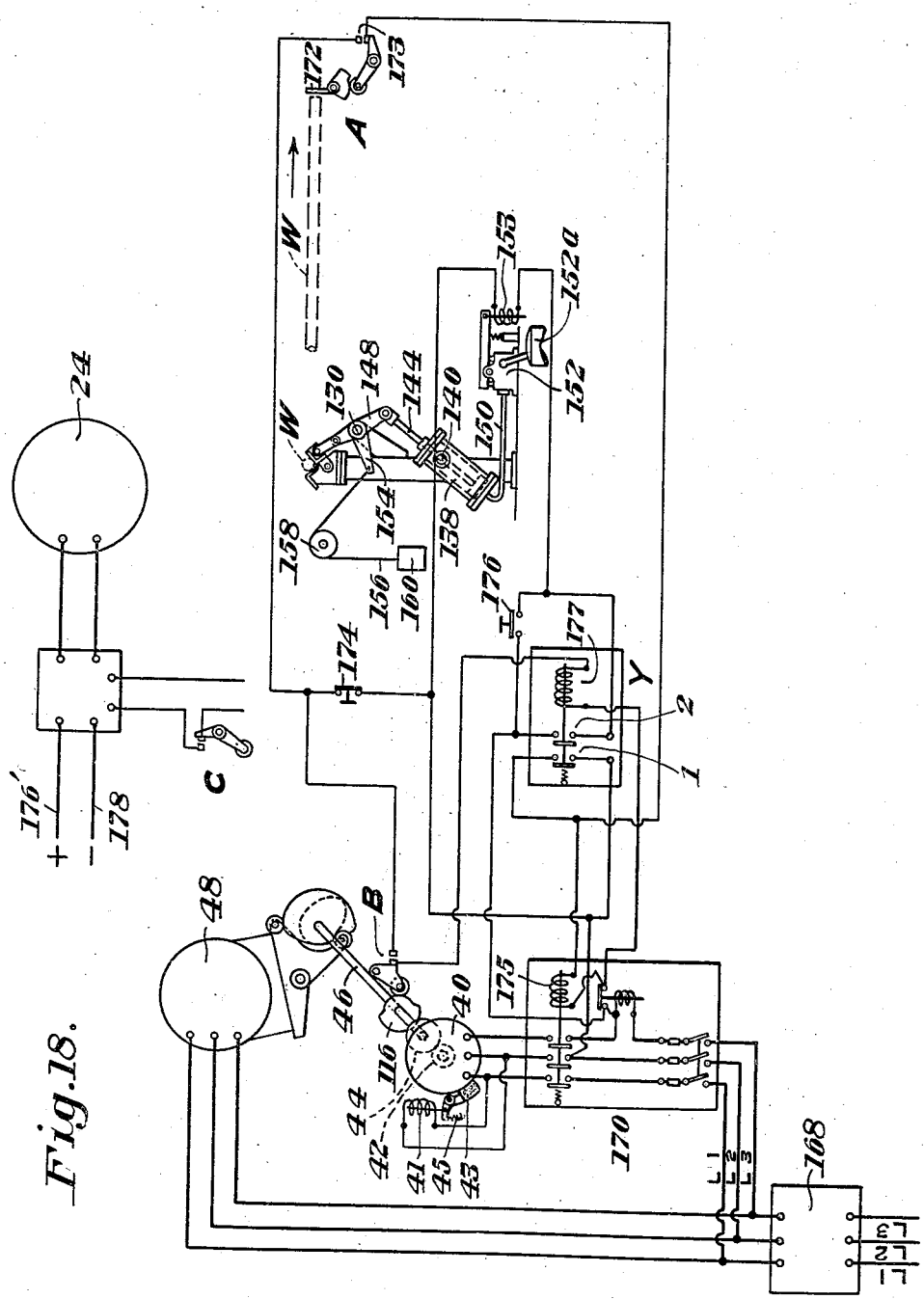

Patented Feb. 8, 1944

2,340,870

UNITED STATES PATENT OFFICE 2,340,870

APPARATUS FOR AUTOMATICALLY SEVERING TUBING

William E. Edwards, Ellwood City, Pa., Willard J. Fletcher, Gary, Ind., and Lysle E. Robinson, Ellwood City, Pa., assignors to National Tube Company, a corporation of New Jersey Application September 29, 1942, Serial No. 460,122

9 Claims. (Cl. 80—3)

The present invention relates to improved apparatus for automatically severing tubing into predetermined lengths as it comes from a tube-reducing machine of known construction.

The improved mechanism includes a carriage which partakes of the longitudinal movement of the oncoming tube. A saw is supported by the carriage in such a way that it can sever the tube transversely while both the tube and carriage are in motion. The mechanism includes a kick-out table for receiving the severed tube, and means are provided for releasing the severed tube so as to permit it to roll by gravity to a storage point or to a suitable shipping receptacle.

As will appear more fully hereinafter, the invention contemplates the provision of automatic means on the carriage for gripping the tube, together with automatic control means governing the timing of the movements of the saw, the operation of the kick-out table, and means for automatically returning the carriage to starting position upon completion of a given cycle of operations.

Means are also provided for automatically interrupting the transmission of power to the tube-reducing machine in the event the saw-supporting carriage reaches the limit of its travel before the saw blade is clear of the work on its back stroke.

For a full understanding of all aspects of the invention, reference should be made to the following detailed disclosure, the accompanying drawings, and the appended claims.

In the drawings:

Figure 1 is a diagrammatic layout of the several main component units of the improved equipment, details of structure being omitted because of the reduced scale of the view.

Figure 2 is an elevation of the principal elements of the tube-reducing mechanism shown in Figure 1.

Figure 3 is a section on line III—III of Figure 2 chiefly illustrating the means for intermittently turning the tube in process.

Figure 4 is an enlarged plan view of the automatic sawing unit shown in Figure 1.

Figure 5 is a longitudinal section through the sawing unit taken on line V—V of Figure 4.

Figure 6 is an elevation of a sawing unit as viewed from the left of Figure 5.

Figures 7 to 13 inclusive are diagrammatic skeleton views illustrative of different positions of certain control cams and parts actuated thereby. This series of figures illustrates the sequential movements and positions occupied by several component parts of the sawing mechanism from the start of the operating cycle until the completion thereof.

Figures 14A and 14B, when placed side by side, jointly depict a plan view of a scale larger than Figure 1.

Figure 15 is a transverse section through the chief operating parts of the kick-out mechanism taken on line XV—XV of Figure 14.

Figure 16 is an elevation of Figure 15 as viewed from the left thereof. (See also section line XVI—XVI of Figure 14.)

Figure 17 is a transverse section with a kick-out table taken on line XVII—XVII of Figure 14.

Figure 18 is a schematic circuit diagram showing the coordination of the electrical control apparatus with the tube-reducing mechanism, the automatic saw, and the kick-out table, in a manner more fully pointed out hereinafter.

General

Referring first to Figure 1 of the drawings, the improved installation includes three main operating units; namely, the tube reducer R, the sawing or severing unit S, and kick-out table T.

The tube reducer R per se is of known construction, and the details thereof form no part of the present invention. However, the operation of other parts is dependent somewhat upon the action of this tube reducer, since the forward motion of the tube emanating therefrom and reduced thereby is utilized to propel the carriage of the unit S. Figures 2 and 3 of the drawings show enough of the tube-reducing mechanism to give complete understanding of the invention herein claimed. Referring to Figure 2, the tube or other work W to be reduced is acted upon by reducing rollers 10 and 12 carried in a traveling frame 14 which is actuated by a pitman 16 connected to a crank-pin 18 carried by a drive gear 20 in turn connected with a pinion 22 which in turn is driven through suitable transmission or reducing gearing from a motor 24. Means indicated generally at 26 in Figure 3 serve to intermittently rotate the work W about its axis a predetermined fraction of a revolution at suitably spaced time intervals in a manner well known to those skilled in the art. This mechanism is not illustrated in detail, since it forms no part of the claimed invention. Suffice it to say that the tube-reducing machine briefly referred to is effective to advance the work W in substantially uniform increments and to partially rotate such work while it is advancing.

The longitudinal movement imparted to the work W by the tube-reducing unit is utilized to actuate the carriage to be presently described which supports a saw adapted to sever the tube transversely while the tube is moving in the direction of its axis. Means to be later described are provided for stopping the operation of the tube drive motor 24 in the event that the carriage of the unit S reaches the limit of its travel prior to the time the saw supported thereby is clear of the work on its back stroke. Thus it will be understood that there is a coordinated or interdependent relationship between the sawing mechanism to be later described and the tube reducing mechanism above briefly referred to. The kick-out table T includes means which are coordinated with the sawing unit in such manner that after each predetermined length of stock has been severed, it is automatically kicked out or directed to a storage point.

Severing mechanism

The severing mechanism, the operation of which is coordinated with that of the tube-reducing mechanism above referred to and the kick-out table T later referred to, is best shown in Figures 4 to 6 inclusive, the cycle of operation of main operating parts being illustrated sequentially in Figures 7 through 14. The severing unit S includes side frames 28 supported on a suitable base. These side frames support longitudinally-extending guide tracks 30—30 on which travel wheels 32—32 of a carriage indicated generally at 34. This carriage on its underside is equipped with guide rollers 36—36 which coact with guide strips 38—38 suitably supported by the fixed frame structure.

Supported on the under-side of the carriage is a feed motor 40 to the armature shaft of which there is secured a gear 42 which meshes with a gear 44 secured to the outer extremity of a cam shaft 46 having a plurality of cams thereon for performing functions hereinafter more fully set forth.

A saw motor 48 for operating the work-severing saw blade 50 is mounted on a rocker base 52 which is pivotally supported on a saw trunnion 54 suitably journaled on the carriage structure. A rocker 56 is mounted for pivotal movement about the axis of the saw trunnion 54 on which the base 52 is mounted. This rocker has one arm 58 carrying a follow roller 60 which coacts with a feed cam 62. The rocker has another arm 64 carrying a follow roller 66 which coacts with a return cam 68 carried by the cam shaft 46. The cam 62, when rotated counter-clockwise as viewed in Figures 7 to 13, inclusive, is effective to rock the arm 58 in the proper direction to move the blade of the saw blade 50 in a direction transverse to the line of travel of the tube W to be severed. After the severing operation, the return cam 68 rocks the arm in the opposite direction to retract the saw blade 50 to the starting position of Figures 6 and 7. In order to impart a feeding motion to the carriage, it is equipped with gripping mechanism adapted to grip the work W as it is fed forward by the tube-reducing unit R. The gripping mechanism is supported from a hollow spindle 70 carried by ball bearings 72 mounted in a housing 74 secured to and moving with the carriage. The gripping mechanism includes a collar 76 which is mounted near one extremity of the hollow spindle 70, the collar being formed with a plurality of T-shaped guide slots 78 which are inclined at an angle to the longitudinal axis of the advancing tube W. Slidingly engaging the slots 78 is a plurality of gripper jaws 80 which, when the collar 76 is moved in the proper direction, are effective to wedgingly force the several gripper jaws into firm engagement with the work W. Since the collar is supported by the spindle which is in turn journaled on the carriage, this will compel the carriage to partake of the movement imparted to the tube by the reducing unit R.

A gripper yoke 82 is mounted on a ball bearing 84 carried by an inner hub portion of the collar 76. An arm 86 of a gripper bell crank 88 is pivotally mounted on a pin 90 secured to a suitable bracket supported by the carriage. A gripper cam 92 secured near one end of the cam shaft 46 is arranged to impart movement to follower rollers 94 carried by a verticallly movable member 96. This member transmits vertical movement to push rods 98 which coact with the outer extremity of the upper arm 87 of the bell crank. Thus it is apparent that the cam 92, through the connections described, controls the action of the gripper, whereby it can be engaged with and disengaged from the work W. The cam 92 positively moves the bell crank in a direction to cause disengagement of the grippers, and it is of such contour that engagement of the grippers can be effected by gripper springs 100 carried by rods 102 pivoted on studs 104, said rods having slidably mounted thereon semi-cylindrical collars which engage sockets formed in the arms 87 of the bell crank 88. The springs 100 react against collars 108 which are adjustably positioned on the rods 102 by nuts 110 threaded thereon. Thus suitable adjustments can be made to vary the magnitude of grip or to adapt the grippers for coaction with work such as tubing or rods of slightly different diameters. When work differing greatly in diameter to that illustrated is to be handled, it will be understood that larger or smaller size gripping collars 76 and correspondingly larger or smaller jaws 80 may be substituted for those shown, and suitable guide bushings 112 and 114 may be secured respectively to the inner end of the hollow spindle 70 and to the outer extremity of the collar 76.

In addition to the gripper cam 92, feed cam 62 and return cam 68, mounted on the cam shaft 46, there is another cam whose function is to close a circuit across the contacts of a relay 1, which circuit includes a solenoid for operating an air valve 152 adapted to admit air to a cylinder 138 to actuate a kick-out table to be presently described.

The gripper yoke 82 surrounding the gripper-actuating collar 76 has connected thereto a cable 83 which is trained over a guide sheave capable of being connected with a counterweight 89 guided by a fixed tubular casing 91. As thus arranged, it will be understood that when the grippers are engaged with the advancing work W, the carriage will be moved forward, it being remembered that the gripper yoke is connected indirectly with the carriage through the bell crank 88. Thus it will be understood that when the grippers are released, the counterweight 89 will serve to return the carriage to the starting position.

Kick-out table

Mounted in juxtaposition with the saw proper on the side remote from the tube-reducing machine is a kick-out table indicated as a whole at T. This is a trough-like structure including a fixed member supported by brackets 120 carried by spaced standards 122. Disposed opposite the side member 118 is a movable member 124 provided with extension ears 126 which pivotally mount the movable member on suitable hinge pins 128.

A line shaft 130 which is substantially coextensive in length with the kick-out table is mounted in suitable bearings carried by the brackets 120. This shaft has keyed or otherwise secured thereto one or more arms 132 carrying counterweights 134, each arm being connected by a link 136 with the movable member 124 of the kick-out table. Normally the counterweights 134 tend to hold the kick-out member 124 in the position shown in Figure 17, so that this member in conjunction with the member 118 defines a substantially V-shaped run-out trough adapted to receive the traveling tube or other cylindrical workpiece W. A suitable adjustable stop screw 120' is threaded through a boss forming part of the bracket 120, and serves to adjustably limit the position of the member 124.

An air cylinder 138 mounted to oscillate about a trunnion 140 has a piston 142 working therein which has connected thereto a piston rod 144 connected by a pin 146 to a lever 148 keyed or otherwise secured to the line shaft 130. Compressed air is supplied to the cylinder 138 through a pipe 150 leading to a solenoid-operated valve 152. This valve is also connected with an air receiver 152ª, air compressor, or suitable source of motive fluid. The line shaft 130 also carries a lever 154 to which there is connected a cable 156 trained around a guide sheave 158 and connected to a counterweight 160 working in a guide 162 supported by any fixed part of the frame structure. With the kick-out table members constructed and arranged as shown and described, it will be apparent that the line shaft 130 for operating the same can be oscillated by the air-actuated piston 142 working in the cylinder 138 in one direction, and the same can be moved in the opposite direction by the counterweight 160. When air pressure is supplied to the cylinder 138 under control of the solenoid valve 152, the piston 142 is moved to the upper position shown in Figure 15. This rocks the line shaft 130 in a proper direction to pull down the link 136 and thus move the movable member 124 of the run-out table from the closed position of Figure 17 to the open position shown in Figure 15. This rocks the line shaft 130 in a proper direction to pull down the link 136 and thus move the movable member 124 of the run-out table from the closed position of Figure 17 to the open position shown in Figure 15. When the solenoid valve moves to such position as to cause the air to be exhausted from the cylinder 138, the counterweight 160 acting through cable 156 and lever 154 rocks the shaft 130 in the opposite direction so as to move the member 124 to the tube-receiving position shown in Fig. 17. It will be understood that when the member 124 is shifted to the open position of Figure 15, the tube will be released or, as expressed by those skilled in the art, "kicked out" so as to be allowed to roll by gravity over the inclined skids 164 so as to direct the same to a storage bin or receptacle 166 which is mounted on suitable structural members in parallel relation to the kick-out table.

As shown in Figure 18, the cam shaft motor 40 is connected electrically with the saw motor 48. Limit switch A as described is mounted on the kick-out table and is adjustable longitudinally therealong so as to cut different predetermined lengths of tube. This limit switch A closes the circuit when the end of an outcoming tube fed by the reducing machine R comes in contact with the finger 172. This closes the circuit through the relay coil 175 and connections shown, and is effective to start the motor 40 which drives the cam shaft 46.

Mounted on the saw carriage is another limit switch B which is adapted to be closed by the cam 116 of shaft 46. This limit switch B closes a circuit through the wires shown in Figure 18 across contact 2 of a relay Y. When this circuit is closed across contact 2 of the relay, a circuit is established through the coil 153 of the solenoid valve 152. This controls the admission of air to the air cylinder 138 which acts to rock the shaft 130, thus moving the member 124 of the kick-out table to the open position of Figure 15, thereby releasing the tube or "kicking it out." The closing of the circuit across contact 2 of the relay Y also transfers the starting circuit across the contact 1 of said relay, and completes the circuit to the cam shaft motor starter 170, thus energizing the cam shaft motor 40 which continues to run after limit switch A opens when the tube rolls out. After the limit switch cam 116 makes a complete revolution, the limit switch B opens and thus stops the cam shaft motor 40. The manually-operated push-button 176 provides means whereby the coil 153 of the solenoid valve 152 can be operated independently from the action of the cam 116.

*Electrical control*

Proper coaction of the interdependent units of the combined tube-reducing machine R, sawing mechanism S and the kick-out mechanism T is made possible by the electrical control devices such as shown diagrammatically in Figures 14 and 18. As shown in Figure 18, the saw blade actuating motor 48 and the cam shaft drive motor 40 are connected electrically through a respective saw motor operating panel 168 and a cam shaft motor 40 starter panel 170 with line wires L', L² and L³ of a 3-phase 220-volt 60-cycle power line. As thus arranged, the cam shaft motor 40 cannot run unless the saw blade motor 48 is running, thus eliminating the possibility of the saw blade feeding into the work until the saw is rotated. The function of the saw is to automatically cut tubes of predetermined length. This length is determined by the location of the limit switch A along the kick-out table. The position of this switch along the table may be varied at the will of the operator. The limit switch A includes a finger 172 which is adapted to be struck by the oncoming end of a tube. When the end of the tube strikes the finger 172 of the switch, it closes the circuit across contacts 173 through coil 175 of a relay as shown in Figure 18, which includes contacts controlling the supply of current from lines L', L², and L³ to the cam shaft motor 40 and saw motor 48.

Since the last section of tube from which the predetermined lengths have previously been cut may be a random length, either shorter or longer than the desired predetermined length, such random length must be removed from the saw with safety, and unless proper safety devices are provided, it would be possible for the operator, when removing the random length, to strike the trigger on the limit switch A and thus set the feed motor M in operation, which would then start the saw through the entire cycle of operation with the possibility of accident or damage being done to the apparatus. To prevent this condition from arising, there is provided a single push-button switch 174. The push-button switch 174 is preferably provided with a locking sleeve which is so arranged that the operator can depress the button, turn the sleeve, and thus hold the circuits open on the limit switch A. This will permit the operator to withdraw from the saw, with safety, the last section of tube, which may be either shorter or longer than the length for which the limit switch A has been set. The cam shaft motor 40 cannot be set in motion until the push-button 174 is reset, since the automatic sawing mechanism is rendered inoperative when the circuit through the contacts of the push-button 174 is open.

A by-pass push-button 176 is provided to permit the operator to close the circuit through the coil of the solenoid air valve 152 independently of the action of the cam shaft motor 40, thus permitting the operator to discharge the random length of tube from the kick-out table. After this has been accomplished, the operator again closes the circuit through the push-button 174, thus resetting the saw for the automatic cycle.

The limit switch B includes contacts which control the circuit through the coil 177 of a relay whose contacts 1 and 2 control respective circuits through the relay coil 175 and valve-operating coil 153 as shown.

A third limit switch C, shown in Figure 18, is pivotally mounted on a fixed support in such a location that the laterally swingable saw mounting on the carriage will rock the switch on its pivot as the carriage approaches the limit of its travel, in the event that after such limit of travel of said carriage, the saw has not been fully retracted laterally far enough to clear the work. This switch C is connected with power supply line wires 176' and 178, which feed the motor 24 which drives the tube-reducing machine. Thus the limit switch C functions as a safety device to shut down the tube reducer R if for any reason the moving saw carriage 34 reaches the limit of its longitudinal travel prior to the time the saw blade has been laterally retracted to a position clear of the work, as shown in Figures 11, 12 and 13.

Operation

As the tube leaves the tube-reducing machine R, it is intermittently rotating and feeding forward toward the sewing unit S. The forward end of the advancing tube W engages the trough-like V-shaped guide 180 and thus is directed toward the entrance end of the spindle. The leading end of the tube passes through the guide bushing 114 past the gripper jaws 80 carried by the hollow spindle, and through the spindle and onto the trough-like table formed jointly by the members 118 and 124. The leading end of the tube engages the trigger or finger 172 of the limit switch A which has been previously set at the correct location to sever a predetermined desired length of tube.

At the start of the cycle, the cams and related parts controlling the functions of the automatic saw are in the relative positions indicated in Figure 7. In this position it will be seen that the saw blade 50 is in its retracted position or out of the path of the oncoming tube W. The saw carriage 34 is held at this time in its forward position by the counterweight 89 (Figure 5). The end of the tube passes over and past the operating finger 172 of limit switch A of the electrical control mechanism hereinbefore described (best shown in Figure 18), which energizes the cam shaft motor 40 which through gears 42 and 44 rotates the cam shaft 46. This rotation causes gripper cam 92 to pass from under the follower roller 94. Thus the follower drops and permits the gripper springs 100 acting through bell cranks 88 to move the outer collar of the gripper in a direction opposite to the tube travel. This causes the jaws 80 to tightly grip the tube. Upon such gripping of the tube, the hollow spindle 70 will immediately start to rotate with the tube and the entire carriage will then travel longitudinally as the result of the forward feeding movement imparted to the tube by the tube-reducing machine shown in Figures 2 and 3.

When the gripper jaws have closed on the tube, the cams on the shaft 46 will have moved to the relative positions shown in Figure 8. Continued rotation of the cam shaft 46 brings the active rise or bulge portion of the feed cam 62 in contact with the bottom cam follower 60 of the rocker arm 58, thus forcing it downwardly. Meanwhile, the contour of the saw return cam 68 is such that it falls away from the follow roller 66 of the rocker arm 64, thus permitting said arm to swing downwardly. It will be understood that the motion of the rocker arm is transmitted to the motor base 52 through the adjustable set screws shown in Figure 6. Thus the saw blade 50 is caused to move transversely to the position shown in Figure 9, thus severing the tube. Immediately after the saw blade completes its transverse cut, the bulge on the limit switch cam 116 contacts the follower roller on the limit switch B. This closes the switch, and maintains a closed circuit through the cam shaft motor 40 and also energizes the winding 153 of the solenoid-operated air valve 152. When this winding is energized, the valve 152 establishes communication between the cylinder 138 and the air supply 152ᵃ. This forces the piston 142 upwardly, thus rocking the line shaft 130, and through the counterweight and arms described, swings the hinged section 124 of the kick-out table down, thus permitting the several workpieces W of predetermined length to roll down the inclined skids 164 into the storage receptacle 166. At this point the cams reach the position shown in Figure 10, where it is noted that the bulge on the return cam 68 has contacted the top follower 66 on the rocker arm 64, thus causing it to swing in the reverse direction so as to withdraw the saw blade from the work.

As shown in Figure 10, the contour of the feed cam 62 is now falling away from the bottom follower 60 of the arm 58, and thus offers no resistance to the return stroke of the saw. The saw is now returning to its original starting position, where it will remain until the remainder of the cycle of the operation is complete.

Figure 11 shows the saw blade in its full retracted position. In this figure it will be noted that the bulge on the gripper cam 92 has contacted the follower 94. This forces said follower 94 and the push rods 98 up against the gripper bell crank arm 87, thus compressing the gripper springs 100 and sliding the gripper collar 76 back on the hollow spindle, moving the gripper jaws 80 to retracted position to release the tube. The counterweight 89 now returns the saw carriage to its original starting position.

Figure 12 illustrates positions of the cams after the cut tube has left the kick-out table. In this position the limit switch A is open, but since the limit switch B is still closed (as illustrated in Figure 9), the motor 40 and cam shaft 46 continue rotating until the cams reach the position illustrated in Figure 13. As shown in this figure, it will be seen that the bulge on the limit switch cam 116 has moved away from the follower roller 94 of the limit switch B, thus allowing the switch to open the circuit to the motor 40. The circuit for the motor 40 includes a magnetic coil 41 which, so long as the motor is operating, is energized. This holds a conventional form of brake 43 in release position. When the circuit of the motor 40 is broken, however, a braking action is exerted by a spring 45 on the armature shaft of the motor. Thus when the limit switch B opens the circuit to motor 40, braking action is automatically applied. The inertia of the parts causes the cam shaft 46 to drift or coast to its final resting position. The angular distance (about 38 degrees) between the limit switch cam 116 positions illustrated in Figures 13 and 7, respectively, discloses the allowance for cam shaft motor drift or coast gradually to a full stop after the motor brake is applied.

The opening movement of the limit switch B is effective to deenergize the solenoid air valve coil 153. This opens the cylinder 138 to exhaust. Thereupon the counterweighted levers 134 and counterweight 160 move the kick-out member 118 to the closed position of Figure 17, thus restoring the kick-out table to its tube-receiving position. This completes the cycle of operation, and the parts are then in readiness to repeat the same cycle when the leading end of the next tube comes in contact with the fingers 172 of the limit switch A.

Although we have described quite specifically the design, construction, and relationship of specific instrumentalities shown which an actual reduction to practice has demonstrated is highly desirable and efficient, it is not to be construed that we are limited thereto, since various modifications may be made by those skilled in the art without departure from the invention as defined in the appended claims.

We claim:

1. An apparatus of the class described, comprising means for longitudinally advancing and turning an elongated workpiece, a carriage supporting a hollow spindle through which the workpiece is advanced by said first-named means, means on the carriage rotatably supporting said spindle to permit such turning of the workpiece, workpiece gripping means associated with said spindle effective to cause the carriage to partake of movement in the direction of travel of the workpiece, a saw and driving means therefor movably mounted on said carriage and adapted to be moved transversely to the line of longitudinal travel of the workpiece, means including a member controlled by the longitudinal movement of the workpiece for automatically causing the saw to sever said workpiece and return to a starting position clear of the path of tube travel, means releasing said tube gripping means upon completion of the severing of the tube, and means for returning the carriage to starting position after said releasing means has been actuated.

2. The combination with a machine which turns a tube and advances it longitudinally, of a carriage supporting a hollow spindle through which the tube is advanced by said machine, means on the carriage rotatably supporting said spindle to permit such turning of the tube, tube gripping means associated with said spindle effective to cause the carriage to partake of movement in the direction of travel of the tube, a saw and driving means therefor movably mounted on said carriage and adapted to be moved transversely to the line of longitudinal travel of the tube, means including a member controlled by the longitudinal movement of the tube for automatically causing the saw to sever said tube and return to a starting position clear of the path of tube travel, means releasing said tube gripping means upon completion of the severing of the tube, means for returning the carriage to starting position after said releasing means has been actuated, a kick-out table having a movable portion adapted to position the tube while it is being severed by said saw, and means for automatically actuating said movable portion upon completion of the severing operattion so as to release the severed tube.

3. The combination with a machine which turns a tube and advances it longitudinally, of a carriage supporting a hollow rotary spindle through which the tube is adapted to pass as it is advanced by said machine, tube gripping means rotatably supported on said spindle effective to transmit the longitudinal movement of the tube to said carriage, a rotary saw and a motor for driving the same, a mounting on the carriage for the saw and motor, means for moving said mounting in one direction transversely of the longitudinal line of tube travel to sever the tube, means for moving said mounting transversely in the reverse direction to withdraw the saw to a starting position clear of the path of travel of the tube, means for releasing the gripping means upon completion of the severing of the tube, and means for returning said carriage to starting position after the gripping means has released its hold on the tube.

4. In an apparatus of the character described, a carriage, means for guiding the latter in a straight line, a hollow spindle rotatably mounted on the carriage, a tube-engaging gripper supported by said spindle, means for automatically engaging the gripper with and disengaging it from a tube positioned in said hollow spindle, a motor-driven saw, a rocker base therefor journaled on a trunnion secured to said carriage, a rocker arm carrying two followers for oscillating said base, respective feed and return cams coacting with said followers effective to feed the saw first in one direction transversely of the tube to sever it and later in the opposite direction to retract the saw to a point clear of the tube, a gripper cam, means coacting therewith for releasing the gripper from the tube, and means for shifting said carriage to a predetermined starting position upon release of said gripper.

5. In an apparatus of the character described, a carriage adapted to be moved in a straight line, ways for guiding the carriage, a hollow spindle rotatably mounted on the carriage, a tube-engaging gripper supported by said spindle, means for automatically engaging the gripper with and disengaging it from a tube positioned in said spindle, a motor-driven saw, a rocker base journaled on a trunnion secured to said carriage, a rocker arm carrying two followers for oscillating said base about the axis of said trunnion, respective feed and return cams coacting with said followers effective to feed the saw first in one direction transversely of the tube positioned in said spindle to sever the tube and later to retract the saw in the opposite direction to a position clear of the tube, a gripper cam, means coacting therewith for releasing the gripper from the tube, means for shifting said carriage to a predetermined starting position upon release of said gripper, a kick-out table having a movable portion adapted to position the tube while it is being severed by said saw, and means for automatically actuating said movable portion upon completion of the severing operation so as to release the severed tube.

6. An apparatus of the class described, comprising means for longitudinally advancing and turning an elongated workpiece and a motor for driving said means, a carriage supporting a hollow spindle, a gripper associated with said spindle, a saw motor mounted on a rocker base trunnioned on said carriage, a saw powered by the saw motor, a cam shaft powered by a cam shaft motor mounted on said carriage, a gripper cam on said shaft for actuating said gripper, a feed cam on said shaft for imparting movement to said rocker base to cause the saw to sever the workpiece positioned by the spindle, a return cam on said shaft effective to rock said rocker in reverse direction to retract the saw to a point clear of said workpiece, a limit-switch-cam on said shaft, a limit switch actuated thereby, power circuit connections common to said saw motor and said cam shaft motor whereby the saw is compelled to be rotating whenever fed transversely by said cam shaft motor, a run-out table including a movable member adapted to receive the severed workpiece, and means controlled by said limit switch for causing said movable member to release the severed workpiece from said run-out table, and switch means controlled by movement of the saw mounting effective to interrupt the supply of electric current to the motor for driving said first-named means in the event that the saw has not been moved to its retracted position out of the line of workpiece travel when the carriage reaches the limit of its travel in the direction of workpiece travel.

7. An apparatus of the class described, comprising means for longitudinally advancing and turning an elongated workpiece, a switch adjustably secured to a fixed support and adaped to be actuated by the leading end of said workpiece, a carriage guided on a track extending along the line of travel of said workpiece, a hollow work-positioning spindle rotatably supported on said carriage, a gripper supported on said spindle, means on the carriage controlled by said switch for actuating said gripper, a saw motor carrying a rotary saw blade, a movable mounting on the carriage for said motor, respective cams for moving said mounting in opposite directions so as to impart a cutting stroke and a retracting stroke to said saw blade, a cam shaft drive motor supported on said carriage for actuating said cams, a limit switch, a cam driven by said cam shaft drive motor effective to actuate said limit switch, a kick-out taable including fixed and movable trough-defining members, a fluid pressure motivated element operatively connected with said movable trough-defining member, and an electrically actuated valve controlled by said limit switch for controlling the operation of said pressure motivated element.

8. The combination with means for longitudinally advancing and turning an elongated workpiece and a drive motor therefor, of a carriage carrying workpiece gripping means effective to cause the carriage to partake of movement in the direction of workpiece travel, workpiece-severing means and a motor therefor supported by the carriage on a member movable transversely to the line of longitudinal travel of the workpiece, means including a switch controlled by the movement of the workpiece adapted to automatically cause the severing means to sever the workpiece and return to a starting position clear of the path of workpiece travel, and a limit switch effective as a safety device to interrupt the supply of current to said advancing means drive motor only in the event that the severing means has not been moved laterally to its retracted position clear of the path of workpiece travel by the time the carriage reaches the limit of its movement in the direction of tube travel.

9. An apparatus of the class described, comprising means for longitudinally advancing and turning an elongated tube and a drive motor therefor, a carriage carrying tube-gripping means effective to move the carriage in the direction of tube travel, a saw and a saw motor, a shiftable support therefor and means for moving it transversely of the line of longitudinal tube travel, means including a switch controlled by movement of the tube adapted to automatically cause the saw, its drive motor and said support to move in a direction to sever the tube and return to a starting position where the saw is clear of the path of tube travel, and a limit switch responsive to movement of the saw to a predetermined position transversely of tube travel effective to interrupt the supply of current to said drive motor for said tube advancing and turning means in the event that the saw has not been moved transversely to its retracted position clear of the path of tube travel by the time the carriage reaches the limit of its movement in the direction of tube travel.

WILLIAM E. EDWARDS.
WILLARD J. FLETCHER.
LYSLE E. ROBINSON.

CERTIFICATE OF CORRECTION.

Patent No. 2,340,870.   February 8, 1944.

WILLIAM E. EDWARDS, ET AL.

It is hereby certified that error appears in the printed specification of the above numbered patent requiring correction as follows: Page 4, first column, line 53, for the word "sewing" read --sawing--; page 5, first column, lines 64, 65 and 66, claim 1, and page 6, second column, line 31, claim 8, for "tube" read --workpiece--; and that the said Letters Patent should be read with this correction therein that the same may conform to the record of the case in the Patent Office.

Signed and sealed this 24th day of October, A. D. 1944.

(Seal)

Leslie Frazer

Acting Commissioner of Patents.